(12) United States Patent
Mupparapu

(10) Patent No.: US 9,009,967 B2
(45) Date of Patent: Apr. 21, 2015

(54) COMPOSITE CATALYST SUBSTRATE

(75) Inventor: Shashank Mupparapu, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1996 days.

(21) Appl. No.: 12/222,005

(22) Filed: Jul. 31, 2008

(65) Prior Publication Data

US 2010/0028220 A1    Feb. 4, 2010

(51) Int. Cl.
| | | |
|---|---|---|
| *B01D 53/34* | (2006.01) | |
| *B32B 3/12* | (2006.01) | |
| *B01D 53/94* | (2006.01) | |
| *B01J 37/02* | (2006.01) | |
| *B01J 23/40* | (2006.01) | |

(52) U.S. Cl.
CPC ........ *B01D 53/945* (2013.01); *B01D 2255/10* (2013.01); *B01D 2255/2092* (2013.01); *B01D 2258/01* (2013.01); *B01J 23/40* (2013.01); *B01J 37/0225* (2013.01); *B01J 37/0244* (2013.01); *Y02T 10/22* (2013.01)

(58) Field of Classification Search
CPC .. B01D 53/945; B01J 37/0225; B01J 37/0244
USPC ........ 422/177, 180; 428/116, 312.2; 427/402, 427/403, 404; 29/890; 502/527.12
See application file for complete search history.

(56) References Cited

U.S. PATENT DOCUMENTS

| | | | |
|---|---|---|---|
| 3,950,175 A * | 4/1976 | Lachman et al. | 501/80 |
| 4,503,128 A * | 3/1985 | Iseli et al. | 428/446 |
| 4,711,009 A | 12/1987 | Cornelison et al. | |
| 4,851,015 A | 7/1989 | Wagner et al. | |
| 5,140,813 A | 8/1992 | Whittenberger | |
| 5,355,973 A | 10/1994 | Wagner et al. | |
| 5,426,269 A | 6/1995 | Wagner et al. | |
| 5,974,791 A | 11/1999 | Hirota et al. | |
| 6,550,573 B2 | 4/2003 | Wagner et al. | |
| 7,129,194 B2 * | 10/2006 | Baca et al. | 502/300 |
| 7,249,455 B2 | 7/2007 | Tumati et al. | |
| 7,278,259 B2 | 10/2007 | Schmeichel et al. | |
| 7,299,793 B1 | 11/2007 | Tyo et al. | |
| 2004/0139734 A1 | 7/2004 | Schmeichel et al. | |
| 2005/0042151 A1 | 2/2005 | Alward et al. | |
| 2005/0159308 A1* | 7/2005 | Bliss et al. | 502/439 |
| 2006/0120937 A1 | 6/2006 | Zuberi | |
| 2007/0240406 A1 | 10/2007 | Zhang et al. | |
| 2008/0028754 A1 | 2/2008 | Tumati et al. | |

\* cited by examiner

*Primary Examiner* — Jill Warden
*Assistant Examiner* — Joye L Woodard
(74) *Attorney, Agent, or Firm* — Finnegan, Henderson, Farabow, Garrett & Dunner, LLP

(57) ABSTRACT

A composite catalyst substrate is provided, which may include a metallic core and a porous ceramic coating on the metallic core. The substrate may also include a washcoat substantially covering the ceramic coating and including a catalyst material configured to react with constituents in an exhaust flow of an exhaust producing engine. The catalyst material may be dispersed in, or coated on, the washcoat.

23 Claims, 3 Drawing Sheets

COMPOSITE CATALYST SUBSTRATE

TECHNICAL FIELD

The present disclosure is directed to a composite catalyst substrate and, more particularly, to a catalyst substrate having a metallic core and a porous ceramic bonded thereto.

BACKGROUND

Engines, including diesel engines, gasoline engines, natural gas engines, and other engines known in the art, may exhaust a complex mixture of air pollutants. The air pollutants may be composed of gaseous material (e.g., CO, $NO_x$, etc.) and solid material, such as particulate matter. Particulate matter may include ash and unburned carbon particles and may sometimes be referred to as soot.

Due to increased environmental concerns, exhaust emission standards have become more stringent. The amount of particulate matter and gaseous pollutants emitted from an engine may be regulated according to the type, size, and/or class of engine. In order to meet these emissions standards, engine manufacturers have pursued improvements in several different engine technologies, such as fuel injection, engine management, and air induction. In addition, engine manufacturers have developed devices and systems for treatment of engine exhaust after it leaves the engine.

Such systems are often referred to as "after-treatment" systems. After-treatment systems may include after-treatment components, such as catalytic converters. For example, systems have been developed that employ Selective Catalytic Reduction (SCR) after-treatment solutions to minimize the amount of harmful constituents exhausted to the environment. Currently, the catalysts employed to convert nitrogen oxides ($NO_x$) into diatomic nitrogen ($N_2$) and water ($H_2O$) in an SCR include, or are coated onto, either a ceramic or metallic substrate. Ceramics and metals each have advantages for use as catalyst substrates. Ceramic substrates, while typically more efficient, may provide inferior structural support. On the other hand, metallic substrates may provide superior structural support but may lack the surface properties (e.g., porosity) that provide the efficiency of a ceramic substrate.

Systems have been developed that provide ceramic substrates with improved strength by including a coating on the ceramic. For example, U.S. Patent Application Publ. No. 2005/0042151 ("the '151 publication") discloses a ceramic catalytic substrate including a chemical/material coating on the inside. However, due to the brittle characteristics of ceramics, any failure of the ceramic substrate disclosed in the '151 publication could result in significant and even catastrophic damage. There remains a desire for a substrate for a catalyst or particulate filter that has strength without sacrificing efficiency.

Accordingly, the present disclosure is directed at improvements in existing catalyst and particulate filter substrates.

SUMMARY

In one aspect, the present disclosure is directed to a composite catalyst substrate. The substrate may include a metallic core and a porous ceramic coating on the metallic core. The substrate may also include a washcoat substantially covering the ceramic coating and including a catalyst material configured to react with constituents in an exhaust flow of an exhaust producing engine. The catalyst material may be dispersed in, or coated on, the washcoat.

In another aspect, the present disclosure is directed to an exhaust after-treatment system. The after-treatment system may include a catalyst-based after-treatment component. The system may also include an exhaust conduit configured to direct a flow of exhaust gases from an exhaust producing engine to the catalyst-based after-treatment component. The catalyst-based after-treatment component may include a catalyst substrate having a metallic core and a porous ceramic coating on the metallic core. The component may further include a washcoat substantially covering the ceramic coating and including a catalyst material configured to react with constituents in the exhaust flow. The catalyst material may be dispersed in, or coated on, the washcoat.

In another aspect, the present disclosure is directed to a method of making a composite catalyst substrate. The method may include applying a coating of porous ceramic material on a metallic core having a honeycomb configuration. The method may also include forming a porous washcoat on the ceramic material. In addition, the method may include incorporating a catalyst on, or into, the washcoat.

DETAILED DESCRIPTION

Reference will now be made in detail to the drawings. Wherever possible, the same reference numbers will be used throughout the drawings to refer to the same or like parts.

Figure 1:
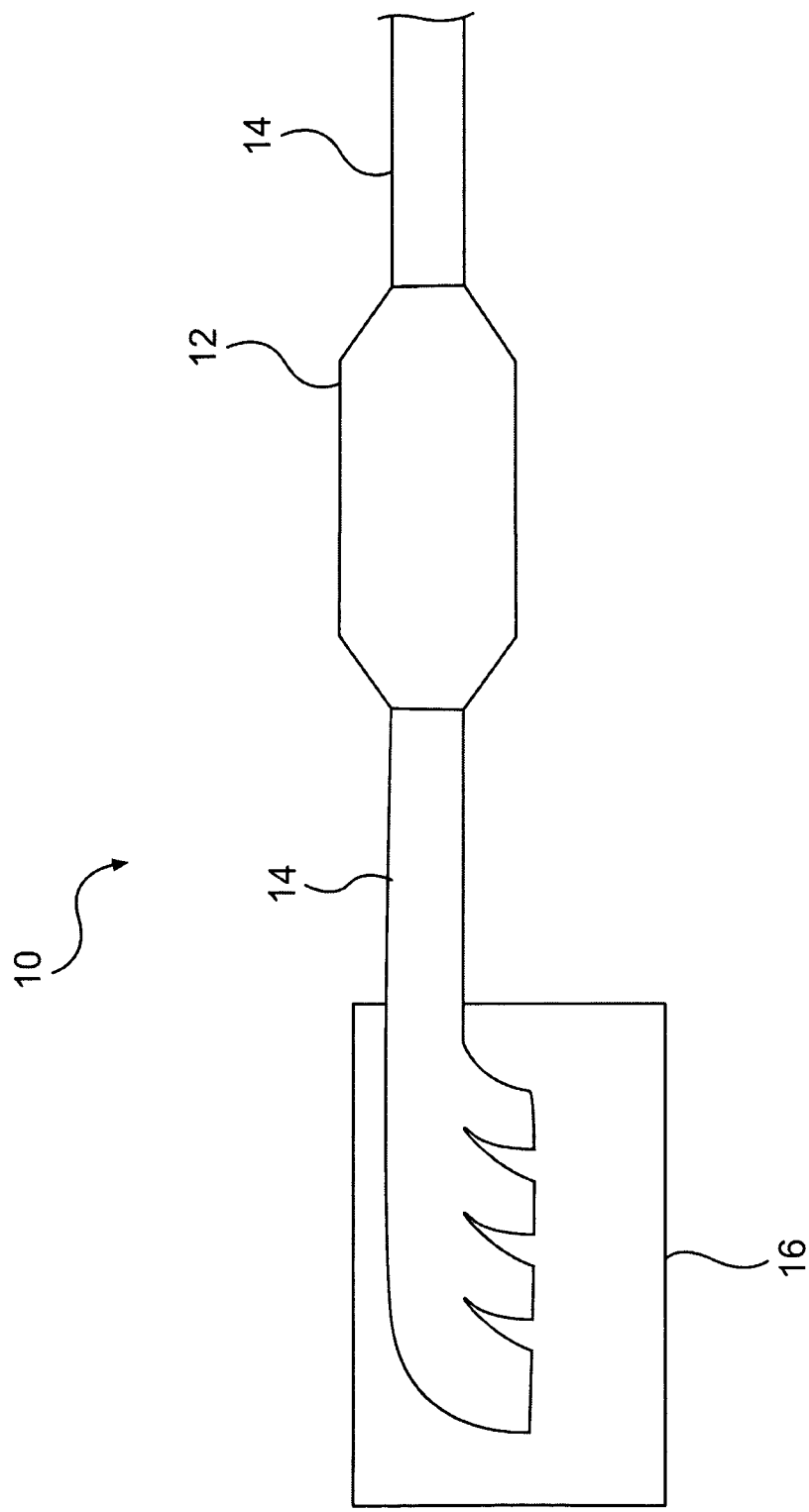
FIG. 1 is a diagrammatic illustration of an exhaust after-treatment system according to an exemplary disclosed embodiment.

FIG. 1 shows an exemplary exhaust after-treatment system 10. System 10 may include a catalyst-based after-treatment component 12. System 10 may also include an exhaust conduit 14 configured to direct a flow of exhaust gases from an exhaust producing engine 16 to catalyst-based after-treatment component 12.

System 10 may include various additional components not shown in the figures. For example, system 10 may include one or more sensors, controllers, and/or other additional exhaust treatment components or features. For example, such additional components may include a particulate trap having a particulate filter (e.g., a diesel particulate filter (DPF)), a particulate trap regeneration device, an exhaust gas recirculation circuit, etc.

Catalyst-based after-treatment component 12 may be configured to provide a significant surface area exposed to exhaust flow, wherein the surface area includes a catalyst for interacting with one or more constituents in the exhaust gases. For example, in some embodiments, catalyst-based after-treatment component 12 may include a reduction catalyst, such as a selective catalytic reduction (SCR) catalyst. Alternatively or additionally, after-treatment component 18 may include an oxidation catalyst, such as a diesel oxidation catalyst (DOC). In some embodiments, catalyst-based after-treatment component 12 may include a lean $NO_x$ trap (LNT).

Figure 2:
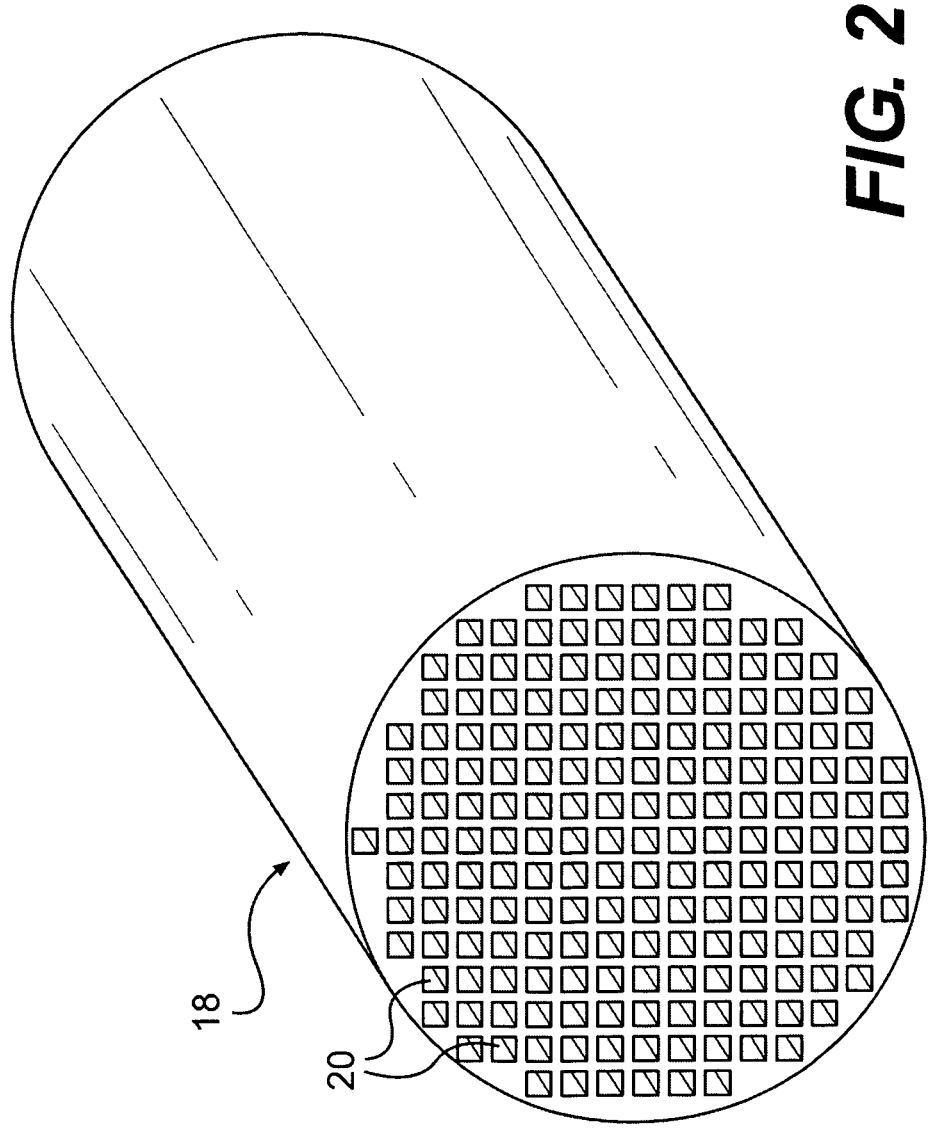
FIG. 2 is a diagrammatic illustration of a catalyst substrate according to an exemplary disclosed embodiment.

Catalyst-based after-treatment component 12 may include a composite catalyst substrate 18. FIG. 2 shows an exemplary embodiment of catalyst substrate 18. The cross-section of catalyst substrate 18 may have any of a number variety of various geometrical shapes. For example, catalyst substrate 18 may have a cross-sectional shape that is circular (as shown in FIG. 2), square, elliptical/oval/racetrack shaped, rectangular, or polygonal. Also, as shown in FIG. 2, some embodiments of catalyst substrate 18 may have a honeycomb configuration.

Figure 3:
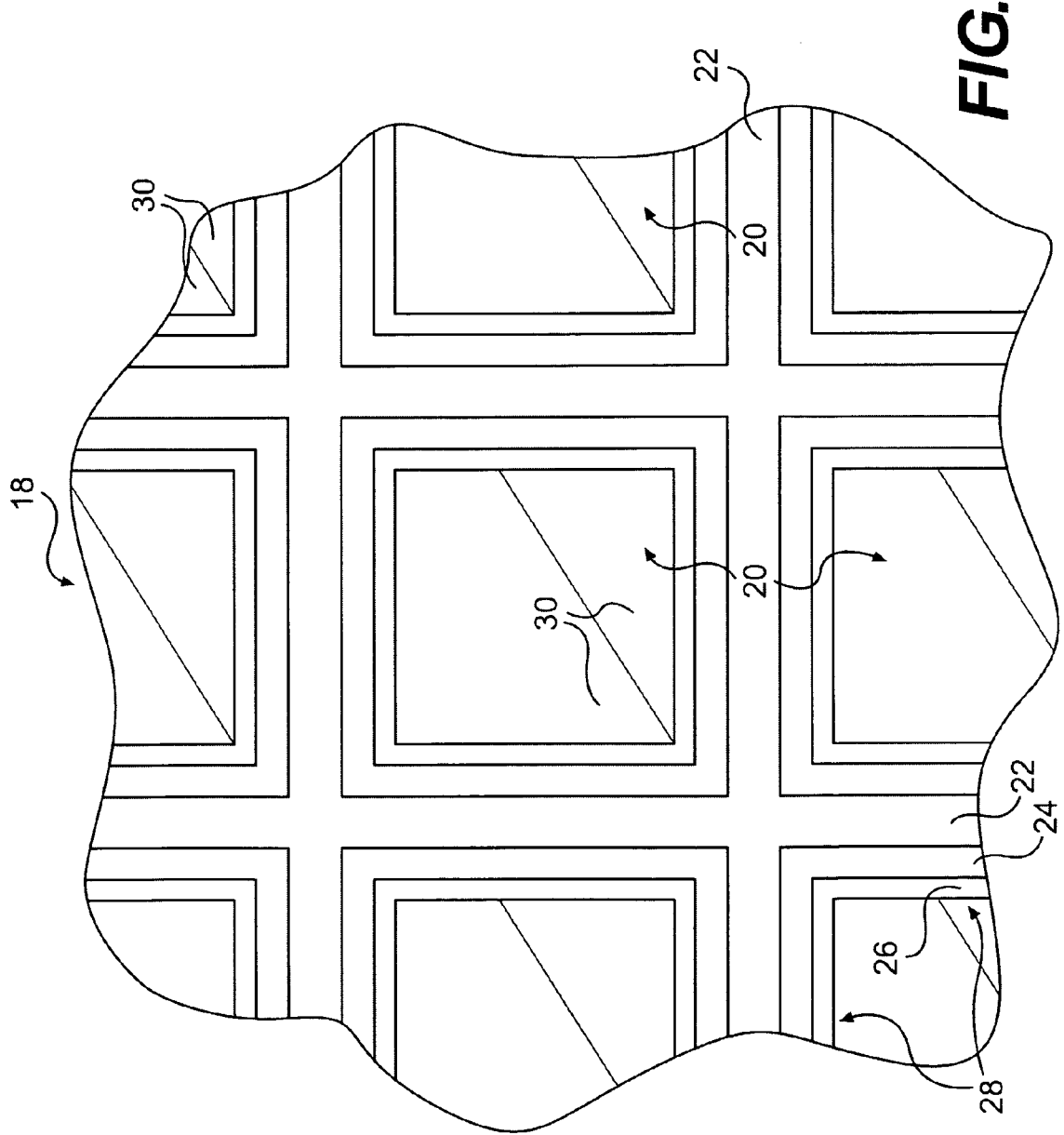
FIG. 3 is a diagrammatic, close-up, cross-sectional view of a catalyst substrate.

FIG. 3 is a close-up view of an embodiment of catalyst substrate 18 having a honeycomb structure. As shown in FIG. 3, the honeycomb structure may define a plurality of elongate, hollow cells 20 through which exhaust may flow. Although cells 20 are shown as having a square cross-section, cells 20 may be any suitable shape, e.g., rectangular, hexagonal, etc. In addition, FIG. 3 shows only a portion of catalyst substrate 18. In some embodiments, catalyst substrate 18 may include as many as 400 cells 20 per square inch or more. In other embodiments, catalyst substrate 18 may include as few as 50 cells per square inch or less.

As shown in FIG. 3, catalyst substrate 18 may include a metallic core 22, a porous ceramic coating 24 on metallic core 22, and a washcoat 26 substantially covering ceramic coating 24. Washcoat 26 may include a catalyst material 28 dispersed therein or coated thereon.

Metallic core 22 may be formed from any metal suitable for the environment within an exhaust flowpath. For example, metallic core 22 may be corrosion-resistant, structurally durable, and capable of withstanding elevated temperatures. In some embodiments, metallic core 22 may include stainless steel (e.g., 304 stainless steel). As shown in FIG. 3, metallic core 22 (and thus catalyst substrate 18) may be formed in a honeycomb configuration, allowing exhaust gases to flow through separate cells 20 having inner walls 30. Metallic core 22 may be impervious to exhaust gases, the exhaust gases may flow along inner walls 30 as opposed to through inner walls 30. Accordingly, each of cells 20 may be open at both ends, allowing exhaust gases to flow completely through each of cells 20, from end to end.

Any suitable porous ceramic material may be used for ceramic coating 24. For example, in some embodiments, ceramic coating 24 may include cordierite, silicon nitride, or other suitable ceramics. In some embodiments, porous ceramic coating 24 may be bonded or otherwise applied to metallic core 22 using a suitable bonding agent or method. As shown in FIG. 3, ceramic coating 24 may be applied to inner walls 30 of cells 20 in the metallic core honeycomb.

Washcoat 26 may include a porous material configured to provide a large surface area for interaction between catalyst material 28 incorporated thereon/therein and constituents of the exhaust flow. For example, washcoat 26 may include alumina ($Al_2O_3$; a.k.a. aluminum oxide). In some embodiments, catalyst material 28 may be mixed in with washcoat 26 before or during application of washcoat 26 to ceramic coating 24. In other embodiments, catalyst material 28 may be applied as a coating on washcoat 26.

Catalyst material 28 may be configured to support a reaction between constituents in the exhaust flow and an oxidizing or reducing agent. Catalyst material 28 may be configured to support any of a variety of exhaust treatment reactions. For example, in some embodiments, catalyst material 28 may be configured to support an oxidation reaction, such as for oxidizing carbon monoxide (CO), carbon dioxide ($CO_2$), or hydrocarbons (HC). In other embodiments, catalyst material 28 may be configured to support a reduction reaction, such as $NO_x$ conversion. In still other embodiments, catalyst material 28 may be configured to support a selective catalytic reduction (SCR) reaction, which also may be used for $NO_x$ conversion. Exemplary equations for each of these types of reactions are as follows:

1. Reduction of nitrogen oxides to nitrogen and oxygen:

$$2NO_x \rightarrow xO_2 + N_2$$

2. Oxidation of carbon monoxide to carbon dioxide:

$$2CO + O_2 \rightarrow 2CO_2$$

3. Oxidation of unburned hydrocarbons (HC) to carbon dioxide and water:

$$2C_xH_y + (2x+y/2)O_2 \rightarrow 2xCO_2 + yH_2O$$

In some embodiments, catalyst material 28 may include a precious metal. For example, catalyst material 28 may include platinum, palladium, rhodium, vanadia (or vanadium), silver, etc. In some embodiments, catalyst material 28 may include a zeolite (e.g., iron zeolite or copper zeolite).

In some embodiments, a catalyst material may be dispersed in, and/or coated on, ceramic coating 24. In such embodiments the catalyst material dispersed in, and/or coated on, ceramic coating 24 may be the same or a different catalyst than catalyst 28 incorporated on and/or in washcoat 26. In other embodiments, ceramic coating 24 may be provided without any catalyst material incorporated therein.

INDUSTRIAL APPLICABILITY

The disclosed after-treatment system 10 with catalyst-based after-treatment component 12 including composite catalyst substrate 18 may be applicable to any exhaust producing engine. After-treatment system 10 may be applicable to mobile systems, such as engines that power mobile vehicles (e.g., automobiles, semi-trailer trucks, construction equipment, marine vessels, etc.). After-treatment system 10 may also be applicable to stationary systems, such as electric power generation sets.

After-treatment system 10 may be applicable to any type of exhaust producing engine. For example, after-treatment system 10 may be applicable to any kind of combustion engine, including engines that run on gasoline, diesel, gaseous fuel (e.g., "natural gas"), etc. In some embodiments, engine 16 may be a dual-fuel type engine.

One advantage of the disclosed composite catalyst substrate 18, is that if ceramic coating 24 were to crack, metallic core 22 may provide reinforcement that can not only prevent catastrophic failure, but can also enable after-treatment component 12 to continue to perform at full, or substantially full, potential. For example, physical stresses as well as differences in thermal expansion rates between metallic core 22 and ceramic coating 24 may cause cracking in ceramic coating 24. However, cracked pieces of ceramic coating 24 may be held in place because of the bonding between ceramic coating 24 and metallic core 22. Therefore, since cracked pieces may be held in place instead of becoming dislodged, ceramic coating 24 and catalyst material 28 applied thereon may continue to perform as intended.

In some embodiments, ceramic coating 24 may be applied to metallic core 22 by dipping metallic core 22 into a ceramic slurry. In such embodiments, the viscosity of the ceramic coating 24 may a factor in determining the cell density of catalyst substrate 18. For example, if the ceramic slurry may has a relatively thick high viscosity, application of such a slurry to inner walls 30 may be facilitated by a lower cell density, i.e., larger cells 20 may be larger. In such embodiments, catalyst substrate 18 may have a cell density lower than approximately 50 cells per square inch. In some embodiments, ceramic coating 24 may be relatively thin. In such embodiments, the ceramic slurry used to apply ceramic coating 24 to metallic core 22 may have a relatively low viscosity.

Alternatively, or additionally, application of ceramic coating 24 to inner walls 30 may be performed using pressure delivery. For example, a vacuum (i.e., substantially low pressure) may be used to draw the ceramic slurry into cells 20. Alternatively or additionally, a high pressure may be used to force the delivery of ceramic slurry into cells 20.

In some embodiments, ceramic coating 24 may be applied to metallic core 22 using a process such as physical vapor deposition (PVD), which is a type of vacuum deposition. Such a coating method may involve physical processes such as high temperature vacuum evaporation or plasma sputter bombardment. PVD may be used to apply a silicon nitride ceramic, or other ceramic coating, to metallic core 22.

In some embodiments, ceramic coating 24 may be applied to metallic core 22 using a chemical process. For example, the application of ceramic coating 24 may include a sol-gel process. In such a process, a thin film (e.g., of metal oxide ceramic) may be applied to inner walls 30 of cells 20. The sol-gel process may include, for example, dip-coating, spin-coating, casting, or chemical solution deposition (CSD). In some embodiments, ceramic coating 24 may be applied using a chemical vapor deposition (CVD) process. CVD may be used to apply a silicon nitride ceramic, or other ceramic coating, to metallic core 22.

In some embodiments, catalyst substrate 18 may be modular. For example, metallic core 22 may include multiple metallic pieces that are assembled to form the structure of catalyst substrate 18 (e.g., the honeycomb structure). In such embodiments, ceramic coating 24 may be applied to the multiple metallic pieces prior to being assembled to form, e.g., the honeycomb configuration.

Nanotechnology may also be utilized to apply ceramic coating 24 to metallic core 22. For example, carbon nanofibers, carbon nanotubes, foil nanolayers, etc. may facilitate the application of ceramic coating 24 to inner walls 30 of cells 20. Additionally or alternatively, the size of the ceramic particles themselves may be relatively small. In some embodiments, the ceramic particles may be in the nano scale range. Nano particles, or particles that are relatively small but not quite nano-scale, may be able to provide the wedding and viscosity to enable coating of the ceramic material on the metallic core. Further, a tailored particle size distribution (i.e., a combination of various ceramic particle sizes) may be used. By using such nanotechnology, a larger cell density may be employed, as the ceramic material may be applied into smaller sized cells.

In addition to the foregoing features that facilitate getting the ceramic material into cells 20, catalyst substrate 18 may also include one or more features to enable the ceramic material to escape from cells 20 in the event pieces of ceramic coating 24 flake off inner walls 30. For example, cells 20 may be tapered from an upstream end to a wider downstream end. In embodiments wherein cells 20 are tapered to a wider downstream end, any pieces of ceramic coating 24 would have a better chance of being carried out of catalyst substrate 18 by the exhaust flow than if cells 20 were not tapered or if cells 20 were tapered to a narrower downstream end. By enabling loose ceramic pieces to be evacuated from cells 20 more readily, tapering cells to a wider downstream end may reduce the risk that such loose ceramic pieces will clog catalyst substrate 18, which could restrict airflow, reduce the amount of effective catalyst surface area, and thus reduce performance of the catalyst. In some embodiments, catalyst substrates having such tapered cells may be positioned downstream of a particulate filter in order to avoid having any ceramic pieces discharged from catalyst substrate accumulate in the particulate filter.

It will be apparent to those having ordinary skill in the art that various modifications and variations can be made to the disclosed composite catalyst substrate without departing from the scope of the disclosed embodiments. Other embodiments of the disclosed system will be apparent to those having ordinary skill in the art from consideration of the specification and practice of the concepts disclosed herein. It is intended that the specification and examples be considered as exemplary only, with a true scope of the disclosed embodiments being indicated by the following claims and their equivalents.

What is claimed is:

1. A composite catalyst substrate, comprising:
a metallic core;
a porous ceramic coating on the metallic core; and
a washcoat substantially covering the ceramic coating and including a catalyst material configured to react with constituents in an exhaust flow of an exhaust producing engine, the catalyst material being dispersed in, or coated on, the washcoat.

2. The substrate of claim 1, wherein the catalyst material includes a precious metal.

3. The substrate of claim 1, wherein the ceramic coating includes cordierite.

4. The substrate of claim 1, wherein the metallic core includes stainless steel.

5. The substrate of claim 1, wherein the substrate is formed in a honeycomb configuration.

6. The substrate of claim 1, wherein the washcoat includes alumina.

7. The substrate of claim 1, wherein the ceramic coating includes a catalyst material dispersed therein, or coated thereon.

8. The substrate of claim 1, wherein the washcoat is porous.

9. An exhaust after-treatment system, comprising:
a catalyst-based after-treatment component; and
an exhaust conduit configured to direct a flow of exhaust gases from an exhaust producing engine to the catalyst-based after-treatment component;
wherein the catalyst-based after-treatment component includes:
a catalyst substrate having a metallic core;
a porous ceramic coating on the metallic core; and
a washcoat substantially covering the ceramic coating and including a catalyst material configured to react with constituents in the exhaust flow, the catalyst material being dispersed in, or coated on, the washcoat.

10. The system of claim 9, wherein the catalyst material includes a precious metal.

11. The system of claim 9, wherein the ceramic coating includes cordierite.

12. The system of claim 9, wherein the metallic core includes stainless steel.

13. The system of claim 9, wherein the substrate is formed in a honeycomb configuration.

14. The system of claim 9, wherein the ceramic coating includes a catalyst material dispersed therein, or coated thereon.

15. The system of claim 9, wherein the washcoat is porous.

16. The system of claim 9, wherein the washcoat includes alumina.

17. A method of making a composite catalyst substrate, comprising:

applying a coating of porous ceramic material on a metallic core having a honeycomb configuration; and forming a porous washcoat on the ceramic material; and incorporating a catalyst on, or into, the washcoat.

18. The method of claim 17, wherein applying the coating of porous ceramic material on the metallic core includes dipping the metallic core into a slurry of porous ceramic material.

19. The method of claim 17, wherein the catalyst material includes a precious metal.

20. The method of claim 17, wherein the porous ceramic material includes cordierite.

21. The method of claim 17, wherein the metallic core includes stainless steel.

22. The method of claim 17, wherein the washcoat includes alumina.

23. The method of claim 17, further including forming the substrate in a honeycomb configuration.

\* \* \* \* \*